July 5, 1927.
J. S. DONALDSON
INCLINOMETER
Filed Oct. 30, 1919
1,634,934
2 Sheets-Sheet 1
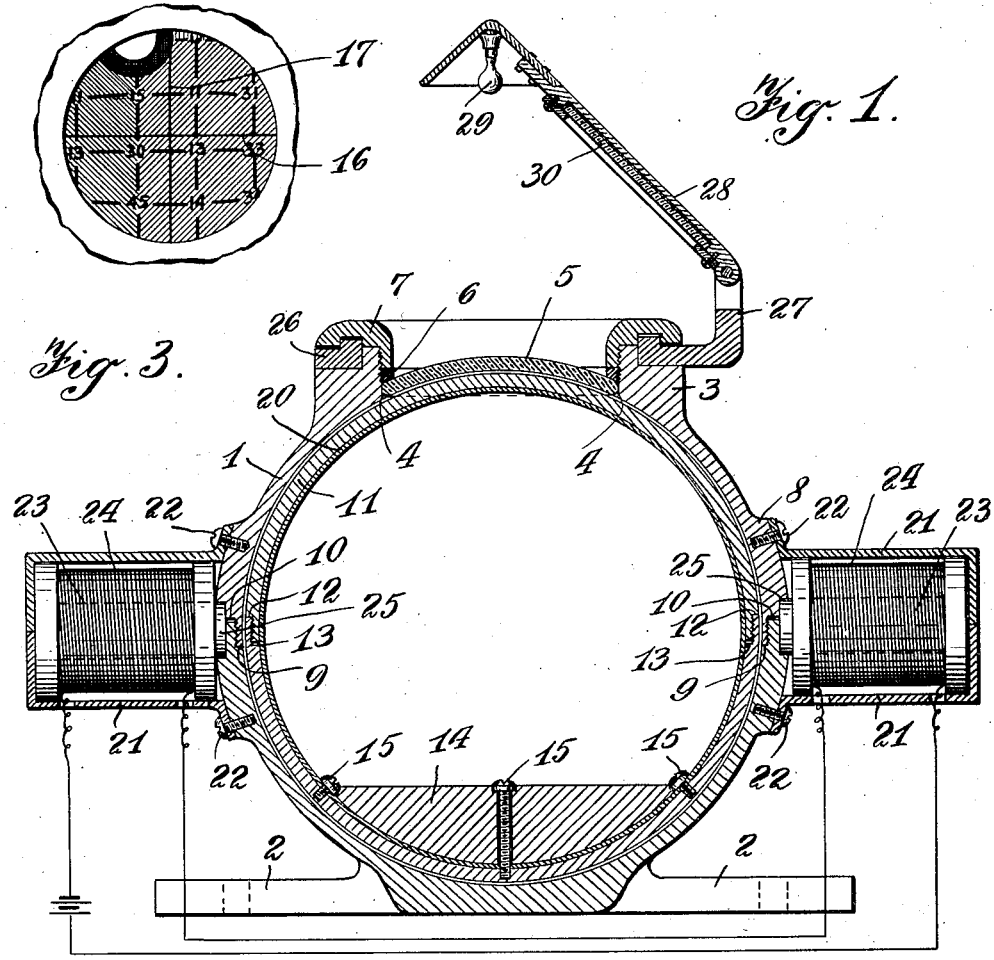
Fig. 1.
Fig. 3.
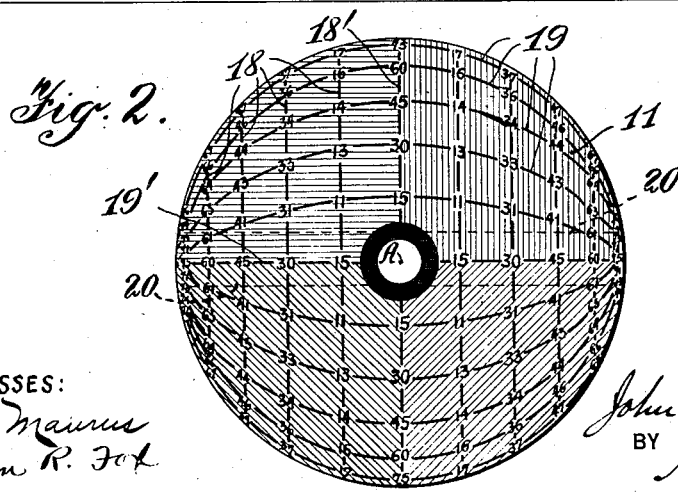
Fig. 2.
WITNESSES:
Maisie Maurus
Lillian R. Fox
INVENTOR
John S. Donaldson
BY
his ATTORNEY July 5, 1927.
J. S. DONALDSON
INCLINOMETER
Filed Oct. 30, 1919
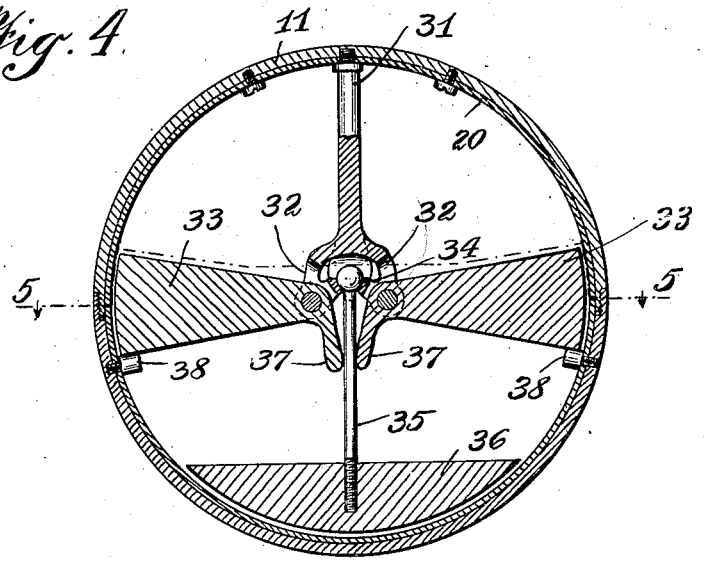
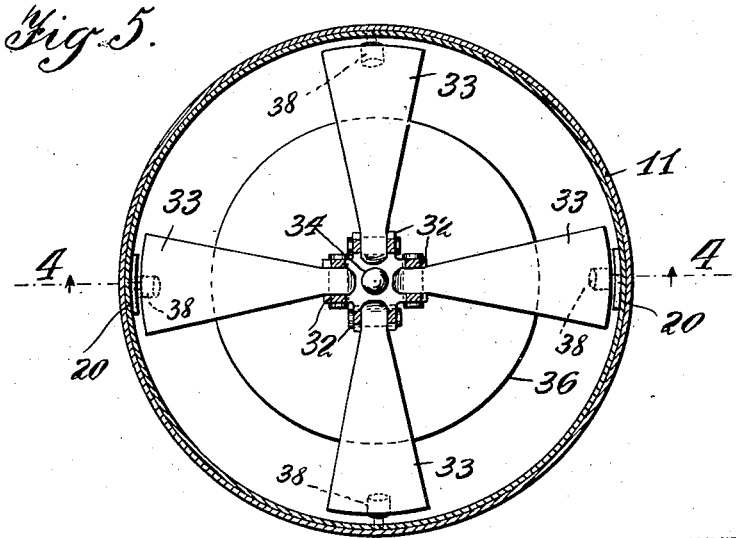

Patented July 5, 1927.

1,634,934

UNITED STATES PATENT OFFICE.

JOHN S. DONALDSON, OF NEW YORK, N. Y.

INCLINOMETER.

Application filed October 30, 1919. Serial No. 334,415.

This invention relates to inclinometers and has for its object to provide an instrument of this class in which dip in two perpendicular directions may be indicated by a single instrument.

My invention is of particular value in connection with airplanes. In order to operate an airplane with safety, it is necessary that the aviator be able to determine at any moment the bank, that is, the lateral dip of the machine, and the climb or peak, that is to say, the longitudinal tip up and down. Heretofore it has been customary to provide separate inclinometers, one of which indicates the bank and the other the climb or peak. In the use of such instruments it has been necessary for the aviator to take readings from two different scales in order to ascertain the inclination of his machine.

By use of my inclinometer, on the other hand, the aviator may by observing a single scale read off both the bank and the climb or peak. I obtain this result by placing the scale upon a member which is eccentrically weighted so as to maintain a constant position relative to the earth's surface. I mount this member in a support relative to which it is free to turn in all directions, and provide means for preventing turning of the eccentrically weighted member relative to the support about the normally vertical axis of the support.

My invention and its other advantages will be clearly understood from a description of the specific embodiments of it illustrated in the accompanying drawings in which:—

Fig. 1 is a transverse section of the entire inclinometer;

Fig. 2 is a top view of the inner sphere showing its coloring and the graduations;

Fig. 3 is a fragmentary view showing the scale as seen through the glass when the instrument is in use;

Fig. 4 is a transverse section of the inner sphere showing a modified form; and

Fig. 5 is a plan view of the inner sphere sectioned upon line 5—5 of Fig. 4 and showing the modification shown in Fig. 4.

The inclinometer illustrated in the drawing has a spherical casing 1 which is preferably made of aluminum. At the bottom of the casing 1 are feet 2 which may be made integral with the casing as illustrated, or in separate pieces. By means of these feet the casing is attached to a normally horizontal surface upon the airplane or other device whose tip is to be measured. At the top of the casing is a neck 3 having an opening surrounded by a shoulder 4. Upon this shoulder is seated a spherical section of glass 5 which may be cemented to the shoulder 4. Above the glass is a washer 6 which is pressed down by the collar 7 which screws into the neck 3. At diametrically opposite points on the sides of the casing 1 are thickened portions or bosses 8.

Between the neck 3 and the collar 7 is a loosely fitting ring 26 bearing a bracket 27 to which is attached an adjustable arm 28. Upon this arm is a light 29 directed upon the glass 5. A mirror 30 may also be mounted upon the arm 28 to enable the operator to look through the glass 5 when the instrument is placed on or above the level of his eye.

For convenience in manufacture, the casing 1 may be constructed in two hemispherical portions which screw together. In order that the inner surface of the shell may be a smooth spherical surface it is desirable that the edges 9 of the shell inside the screw threads come together slightly before the edges 10 of the shell outside the screw threads.

Within the casing is the hollow sphere 11 which is most desirably made of non-magnetic metal such as aluminum or copper. This sphere may also be constructed in two portions which screw together. In order that its outer surface may be smooth, it is desirable that the edges 12 of the sphere outside the screw threads come together slightly before the edges 13 inside the screw threads. Within the shell is an eccentric weight 14. This weight is preferably of lead and is attached at the bottom of the shell by means of three screws 15.

A clearance is allowed between the sphere 11 and the spherical casing 1. I have found a clearance of 1/64th of an inch satisfactory. In order to avoid friction and enable the sphere to turn freely in all directions relative to the casing, the space between the sphere and the casing is filled with a transparent oil. The entire weight of the sphere and its contents is preferably equal to the weight of the volume of oil which the sphere displaces, so that the sphere floats within the casing without pressing against it at any point.

As the sphere 11 is free to turn in the casing 1, the diameter of the sphere passing through the center of gravity of the eccentric weight remains vertical no matter how the casing may be tipped. To enable the observer to read off the tip at any moment, the glass 5 is provided with lines 16 and 17 (Fig. 3) intersecting at right angles at the top point of the casing, and the sphere 11 is provided with a scale composed of equi-distant parallels 18 and equi-distant meridians 19 (Figs. 2 and 3). In order to maintain the scale lines 18, 19, parallel to the intersecting lines 16 and 17 on the glass, magnetic means are provided to prevent the turning of the sphere relative to the casing in the normally horizontal plane of the casing, i. e., turning about the normally vertical axis of the casing, which passes through the intersection of the cross lines 16, 17. A band 20 of magnetic material, preferably soft iron, is attached to the inner surface of the sphere 11 by means of the three screws 15. The band 20 intersects the diameter of the sphere which passes through the center of gravity of the eccentric weight 14 so that the band is maintained always in a vertical position. Electro-magnets are attached to the bosses 8 of the casing. The magnets are held in split cylindrical casings 21 which are attached to the bosses 8 by the screws 22. Each magnet consists of a core 23 of magnetic material, such as soft iron, and an electric winding 24. The cores 23 lie along extensions of a diameter of the casing. The inner end of the cores may be set in sockets 25 in the bosses 8 in order to bring them as near as possible to the band 20. The inner ends of the cores are of the same width as the band 20. The electrical connections with the windings 24 (shown diagrammatically in Fig. 1) are arranged so as to energize the cores in such a way as to make the end of one core adjacent to the band a north pole and the end of the other core adjacent to the band a south pole. When the magnets are thus energized, a magnetic flux is produced through the band 20. The attraction between the magnets and the band 20 prevents the sphere 11 from turning relative to the casing in the normally horizontal plane of the casing, i. e., from turning about the normally vertical axis of the casing, but permits it to turn freely relative to the casing in all other directions.

The scale upon the sphere shown in Fig. 2 and partially shown in Fig. 3 enables the observer to make instantaneous readings of both the bank and the climb or peak. While the instrument may be placed in any desired position in the airplane it is convenient in order to describe the method of reading the scale to assume that it is so placed that the parallels 18 are parallel to the longitudinal axis of the airplane, the front end of the airplane being at the top of Fig. 2, and that the instrument is below the operator so that he looks directly through the glass 5 without the use of the mirror. The scale consists of parallels 18 spaced at intervals of 15° from the top point A of the sphere, and meridians 19 also spaced at intervals of 15° from the top point A, and numbers at the intersections of the meridians and parallels. The numbers at the intersections of the meridian 19' which passes through the upper point A with the parallels indicate the number of degrees of bank from the point A, and the numbers at the intersections of the parallel 18' passing through the point A with the meridians indicate the number of degrees of peak or climb from the point A. The numbers at the other intersections consist of two figures, the first of which indicates arbitrarily the number of degrees of bank, and the second of which indicates arbitrarily the number of degrees of peak or climb. In the case of these numbers, the figure 1 represents 15°, the figure 3, 30°, the figure 4, 45°, the figure 6, 60°, the figure 7, 75° and the figure 9, 90°.

It will be observed that the figures upon each of the quadrants of the upper hemisphere of the sphere 11 are the same. In order to enable the observer to know which quadrant he is looking at, I have colored each of the quadrants differently. As seen in Fig. 2, the upper left-hand quadrant which indicates peak and bank to the left is blue, the upper right-hand quadrant which indicates peak and bank to the right is red, the lower left-hand quadrant which indicates climb and bank to the left is green, and the lower right-hand quadrant which indicates climb and bank to the right is purple. The way in which the scale is used is clearly indicated in Fig. 3. It will be observed that in this figure the point of intersection of the lines 16 and 17 upon the glass lies against the purple quadrant. A mere glance at the glass will, therefore, indicate to the operator that his plane is banked or tipped up to the right and is climbing. The number 13 which is nearest to the intersection point of the lines 16 and 17 indicates that the bank is a little less than 15° and that the climb is a little less than 30°.

The lower half of the sphere 11 may be graduated in the same way as the upper half and its quadrants marked in four different colors. It is usually sufficient, however, to limit the graduations to the upper hemisphere and make the lower hemisphere of a single color contrasting with the colors of the four upper quadrants. When this arrangement is used, the aviator on seeing the color which is used for the lower hemisphere appear under the glass knows that his plane is upside down, and this is generally all the information that he requires under these circumstances.

In the modification shown in Figs. 4 and 5, I have illustrated a device for compensating for the inertia or momentum of the eccentric weight when the airplane is changing its speed or direction. A rod 31 extends downwardly from the top point of the sphere 11. At the lower end of this rod in the plane of the middle of the sphere are four forks 32 on which are pivoted the four upper weights 33 which normally lie in the middle plane of the sphere. Stops 38 are provided to prevent the upper weights from swinging below the middle of the sphere. The four forks come together and form the socket of universal joint 34 from which extends a rod 35 bearing at its lower end the lower weight 36. On the weights 33 are the projections 37 which contact with the rod 35, when the weights are in their normal position shown in Fig. 4. When the airplane is changing its speed, the inertia of the lower weight 36 tends to make it swing forward or backward on the universal joint 34. This presses the rod 35 against one of the projections 37 and causes it to raise one of the upper weights 33. The inertia of the weight thus raised above the center of the sphere tends to counteract the inertia of the lower weight 36, and thus tends to prevent a turning of the whole sphere out of plumb under the effect of the acceleration or slowing. Similarly in the case of a change of direction of the airplane, the swinging of the weights tends to prevent the sphere from tipping out of plumb under the effect of centrifugal force.

From the detailed description of my inclinometer, its numerous advantages are apparent. Among them are the following:— The instrument is not affected by vibration, and in the case of quick changes of inclination the sphere 11 moves smoothly relative to the casing to the correct position, and the oscillatory movement which has made it difficult to read the scales of the inclinometers previously used is done away with. The mounting of the eccentrically weighted member is such that it may tip with equal ease in all directions, the effect of the magnets being merely to prevent turning of the eccentrically weighted member relative to the casing about the normally vertical axis of the casing. Accuracy in both the bank, climb or peak readings is thus assured.

It is apparent that the specific embodiments of my invention may be changed in many ways without departing from the invention. Thus, the magnets need not be electrically excited, the band 21 need not necessarily be made continuous, and the use of the particular anti-friction means described is not essential.

While in the embodiment described the magnetic elements are so arranged as to prevent such a turning of the sphere relative to the casing as would bring the graduations on the sphere out of parallelism with the lines upon the glass of the casing, the utility of these elements is not limited to their use in connection with such markings. Whatever the type of marking upon the sphere or the casing it is apparent that satisfactory readings cannot be made if the sphere is allowed to spin in the casing. The magnetic elements restraining the sphere from turning relatively to the casing in one plane of the casing prevent such spinning. As I believe that these elements are entirely new in an instrument of this character, I wish it understood that use of them for any desired purpose is within the scope of my invention.

What is claimed is:

1. An inclinometer, comprising the combination of an eccentrically weighted member, a support for said member in which it is free to turn in all directions, magnetic elements attached to said eccentrically weighted member and said support respectively to prevent said member turning relative to the support about the normally vertical axis of the support, and means for measuring the displacement of the support relative to the member.

2. In an inclinometer, the combination of an eccentrically weighted member, a support for said member in which it is free to turn in all directions about a point fixed in relation to said support, a vertical band of magnetic material carried by said eccentrically weighted member and curved so as to be equi-distant at all points from the point about which said member turns, and a magnet carried by said support having one of its poles adjacent to said band.

3. In an inclinometer, the combination of an eccentrically weighted member, a support for said member in which it is free to turn in all directions about a point fixed in relation to said support, a vertical band of magnetic material carried by said eccentrically weighted member and curved so as to be equi-distant at all points from a point about which said member turns, and a magnet carried by said support having one of its poles adjacent to said band, said poles being of a width equal to the width of the band.

4. In an inclinometer, the combination of an eccentrically weighted member, a support for said member in which it is free to turn in all directions, a vertical band of magnetic material carried by said member and curved so as to be equi-distant at all points from the point about which said member tips, and two magnets carried by said support upon opposite sides of said member and having opposite poles adjacent to said band.

5. An inclinometer, comprising the combination of an eccentrically weighted member, a support for said member in which it is free to turn in all directions, said member having a spherically curved surface and having graduations, said support having thereon a pair of perpendicular lines adjacent to said graduated surface and intersecting at a point on the normally vertical axis of the support, and magnetic elements borne by said member and said support respectively for preventing the turning of said member relative to said support about the normally vertical axis of the support.

6. In an inclinometer, the combination of a sphere, a support for said sphere, the sphere being mounted in the support so as to turn freely in all directions relative to the support, directing means in said sphere arranged to direct one radius of the sphere toward the center of the earth, and magnetic elements attached to said sphere and said support respectively to prevent the turning of the sphere relative to the support in one plane of the support.

7. In an inclinometer, the combination of a sphere, a support for said sphere, the sphere being mounted in the support so as to turn freely in all directions relative to the support, there being graduations marked upon the outer surface of said sphere and including two great circles intersecting at right angles, directing means in said sphere arranged to direct the radius of the sphere passing through one of the points at which said great circles intersect towards the center of the earth, and magnetic elements attached to the sphere and to the support respectively for preventing the sphere from turning relative to the support in a plane perpendicular to one of said great circles.

8. An inclinometer, comprising the combination of a sphere, a support for the sphere, the sphere being so mounted in the support that it is free to turn in all directions relative to the support, an eccentric weight in said sphere, magnetic elements attached to said sphere and said support respectively and so arranged as to prevent the sphere from turning relative to the support about the normally vertical axis of the support, and means for measuring the displacement of the support relative to the sphere.

9. In an inclinometer, the combination of a sphere of non-magnetic material, a support for said sphere, the sphere being so mounted in the support as to be free to turn in all directions relative to the support, directing means in said sphere arranged to direct one radius of said sphere towards the center of the earth, a band of magnetic material carried by and concentric with said sphere, and means carried by said support for producing a magnetic flux through said band.

10. In an inclinometer, the combination of a sphere of non-magnetic material, a support for said sphere in which it is free to turn in all directions, an eccentric weight in said sphere, a vertical band of magnetic material carried by and concentric with said sphere, and a pair of magnets mounted at diametrically opposite points of said support, one of said magnets having its north pole adjacent to said band and the other of said magnets having its south pole adjacent to said band.

11. In an inclinometer, the combination of a sphere of non-magnetic material, a support for said sphere in which it is free to turn in all directions, an eccentric weight in said sphere, a vertical concentric band of magnetic material carried by said sphere, a pair of oppositely disposed electromagnets carried by said support, and means for passing an electric current through the windings of said magnets.

12. In an inclinometer the combination of a spherical casing, a sphere within said casing, anti-friction means between the sphere and the casing, directing means in said sphere arranged to direct one radius of said sphere towards the center of the earth, and magnetic elements carried by the sphere and the casing respectively to prevent turning of the sphere relative to the casing in one plane of said casing.

13. In an inclinometer, the combination of a spherical casing, an eccentrically weighted sphere within said casing, anti-friction means between said sphere and said casing, and magnetic elements carried by said sphere and said casing respectively for preventing turning of the sphere relative to the casing about the normally vertical axis of the casing.

14. In an inclinometer, the combination of a spherical casing, a sphere within said casing, a film of oil filling the space between the sphere and the casing, directing means in said sphere arranged to direct one radius of said sphere towards the center of the earth, and magnetic elements carried by said sphere and said casing respectively to prevent turning of the sphere relative to the casing in one plane of the casing.

15. In an inclinometer, the combination of a spherical casing, an eccentrically weighted sphere within said casing, a film of oil filling the space between said sphere and said casing, and magnetic elements carried by said sphere and said casing respectively for preventing turning of the sphere relative to the casing about the normally vertical axis of the casing.

16. In an inclinometer, the combination of a spherical casing, an eccentrically weighted sphere within said casing, a liquid filling the space between said sphere and said casing, the weight of the sphere being equal to the weight of the volume of liquid displaced by said sphere so that said sphere floats in said liquid, and magnetic elements carried by said sphere and said casing respectively for preventing the turning of the sphere relative to the casing about the normally vertical axis of the casing.

17. In an inclinometer, the combination of a casing, an eccentrically weighted member supported in said casing so as to be free to turn in all directions relative to said casing, and a spherically curved surface carried by said eccentrically weighted member, said surface being divided into four quadrants colored differently and having graduations, said casing being provided with a transparent opening through which a relatively small part of said spherical surface may be seen and having two lines intersecting at right angles across said opening.

18. In an inclinometer, a sphere mounted so as to turn freely in all directions, directing means to retain said sphere in a constant position relative to the earth, said sphere having its upper hemisphere divided into four quadrants colored differently and its lower hemisphere of a color different from any of said quadrants.

19. In an inclinometer, a sphere mounted so as to turn freely in all directions, directing means to maintain said sphere in a fixed position relative to the earth, said sphere having upon its upper hemisphere four quadrants colored differently, and a series of meridians and parallels, and figures at the intersection of said meridians and parallels indicating angular distances from the top of the sphere.

20. In an inclinometer, a member mounted so as to turn freely in all directions, directing means to maintain said member in a constant position relative to the earth, said member being provided with a spherically curved surface, and on said surface a series of meridians and parallels, and having at the intersections of the meridians and parallels not passing through the upper point of the surface numbers composed of two figures, the first of which indicates the number of degrees from the top of the surface to the intersecting parallel, and the second of which represents the number of degrees from the top of the surface to the intersecting meridian.

21. In an inclinometer, a member mounted so as to turn freely in all directions, directing means to maintain said member in a constant position relative to the earth, said member being provided with a spherically curved surface, and on said surface a series of meridians and parallels with numbers at the intersections of the meridians and the parallels passing through the upper point of the surface with the other meridians and parallels indicating the number of degrees from the upper point of the surface, and having at the intersections of the meridians and parallels not passing through the upper point of the surface numbers composed of two figures, the first of which indicates the number of degrees from the top of the surface to the intersecting parallel, and the second of which represents the number of degrees from the top of the surface to the intersecting meridian.

22. In an inclinometer, the combination of a casing having a transparent opening and a line across said opening, a sphere supported by said casing so as to be free to turn in all directions, parallel graduations on said sphere, directing means in said sphere arranged to direct one radius of said sphere towards the center of the earth, and magnetic elements carried by said casing and said sphere respectively and arranged to keep said graduations always parallel to said line.

23. An inclinometer, comprising the combination of an eccentrically weighted member provided with a spherically curved surface, there being graduations upon said surface, a casing for said eccentrically weighted member in which it is free to turn in all directions, said casing being provided with an opening and two lines intersecting at right angles across said opening, and magnetic elements attached to said eccentrically weighted member and said casing respectively and arranged to prevent said member from turning relative to said casing about the axis of the casing which extends through the intersection of said lines.

24. An inclinometer, comprising a spherical casing having an aperture at the top thereof, a spherical piece of glass across said aperture, intersecting perpendicular lines upon said glass, an eccentrically weighted sphere within said casing, there being graduations on the surface of said sphere, a film of transparent oil between said sphere and said casing, magnetic elements attached to said casing and sphere respectively and arranged to prevent turning of the sphere relative to the casing about the axis of the casing which passes through the intersection of said perpendicular lines.

25. An inclinometer, comprising a spherical casing having an aperture at the top thereof, there being a shoulder surrounding said aperture, a spherical piece of glass across said aperture resting upon said shoulder and having lines thereon, a collar arranged to screw upon said casing and exert pressure against said glass, a hollow sphere within said casing of non-magnetic material, a film of oil between said sphere and said casing, a fixed eccentric weight in said sphere, graduations on the outer surface of said sphere, a band of magnetic metal concentric with said sphere and attached to the inner surface of said sphere, a pair of electro magnets attached to said casing at diametrically opposite points and having their axes lying upon the extension of a diameter of said sphere and lying in a normally vertical plane of said casing, and means for passing an electric current through the windings of said magnets to energize them so that the end of one magnet adjacent to the sphere is a north pole and the end of the other magnet adjacent to the sphere is a south pole, whereby said magnets retain the sphere with its band in a plane containing the axes of the magnets and cause a magnetic flux through the band.

26. In an inclinometer, the combination of a sphere, a support in which said sphere is free to turn in all directions, a lower weight in said sphere mounted so as to be free to swing in any direction within the sphere, upper weights near the middle of the sphere, and connecting means between the lower weight and the upper weights arranged to raise the one or more of said upper weights toward which the lower weight swings and adapted to permit the upper weights which have been raised to return to their normal position under the action of gravity when the lower weight returns to its lowest position within the sphere.

27. In an inclinometer, the combination of a casing, an indicating member supported in said casing so as to be free to turn in all directions relative to said casing, cooperating elements on the indicating member and the casing arranged to prevent turning of the sphere relative to the casing about the normally vertical axis of the casing, a spherically curved surface borne by said indicating member, and directing means arranged to maintain a point of said spherically curved surface uppermost, said spherically curved surface being divided into four quadrants colored differently and having graduations, and said casing being provided, at the upper end of its normally vertical axis, with a transparent opening through which a relatively small part of said spherical surface may be seen and having two lines intersecting at right angles across said opening.

28. In an inclinometer, the combination of a spherical casing, a sphere within said casing supported so as to be free to turn in all directions relative to said casing, cooperating elements on the sphere and the casing arranged to prevent turning of the sphere relative to the casing about one axis of the casing, and directing means in said sphere arranged to direct one radius thereof toward the center of the earth, the upper hemisphere of said sphere being divided into four quadrants colored differently and having graduations, and said casing having, at one end of its aforesaid axis, a transparent opening through which a relatively small part of the surface of said sphere may be seen and having two lines intersecting at right angles across said opening.

29. In an inclinometer, the combination of a spherical casing, a sphere within said casing supported so as to be free to turn in all directions relative to said casing, cooperating elements on the sphere and the casing arranged to prevent relative turning of the sphere with respect to the casing about one axis of the casing, and directing means in said sphere arranged to direct one radius of said sphere towards the center of the earth.

30. In an inclinometer, the combination of a spherical casing, a sphere within said casing supported so as to be free to turn in all directions relative to said casing, cooperating elements on the sphere and the casing arranged to prevent relative turning of the sphere with respect to the casing about one axis of the casing, directing means in said sphere arranged to direct one radius thereof toward the center of the earth, the upper hemisphere of said sphere being divided into four quadrants colored differently, and said casing having a transparent opening through which a relatively small part of the surface of said sphere may be seen.

In testimony whereof I have hereunto set my hand.

JOHN S. DONALDSON.